United States Patent [19]

Paufve et al.

[11] Patent Number: 5,068,509

[45] Date of Patent: Nov. 26, 1991

[54] HIGH FREQUENCY THERMODE DRIVEN DEVICE EMPLOYING ONE-TURN-SECONDARY TRANSFORMERS

[75] Inventors: Eldred H. Paufve, Windsor; Richard Porterfield, Binghamton, both of N.Y.

[73] Assignee: Universal Instruments Corporation, Binghamton, N.Y.

[21] Appl. No.: 463,456

[22] Filed: Jan. 11, 1990

[51] Int. Cl.$^5$ .............................................. B23K 3/00
[52] U.S. Cl. ................................................. 219/85.16
[58] Field of Search .................. 219/85.16, 85.18, 116, 219/9.5, 233, 234, 235

[56] References Cited

U.S. PATENT DOCUMENTS 4,496,821 1/1985 Burgher et al. ..................... 219/116
4,822,969 4/1989 Yao .................................. 219/116 X
4,912,743 3/1990 Zeltner ............................. 219/85.16

Primary Examiner—Marvin M. Lateef
Attorney, Agent, or Firm—Fidelman & Wolffe

[57] ABSTRACT

A high frequency thermode-driven device for use in hotbar soldering has a unitary metal support frame which is used for the secondaries of four individual transformers. The support frame also serves as the structural member to which the transformer and thermodes themselves are fastened. This is possible because the secondaries require only one turn; the upstanding ears of projections which extend radially outwardly from the support frame so as to protrude through the apertures in the transformer cores provide a source of voltage and become a secondary winding when connected to a load impedance, such as a thermode.

6 Claims, 3 Drawing Sheets

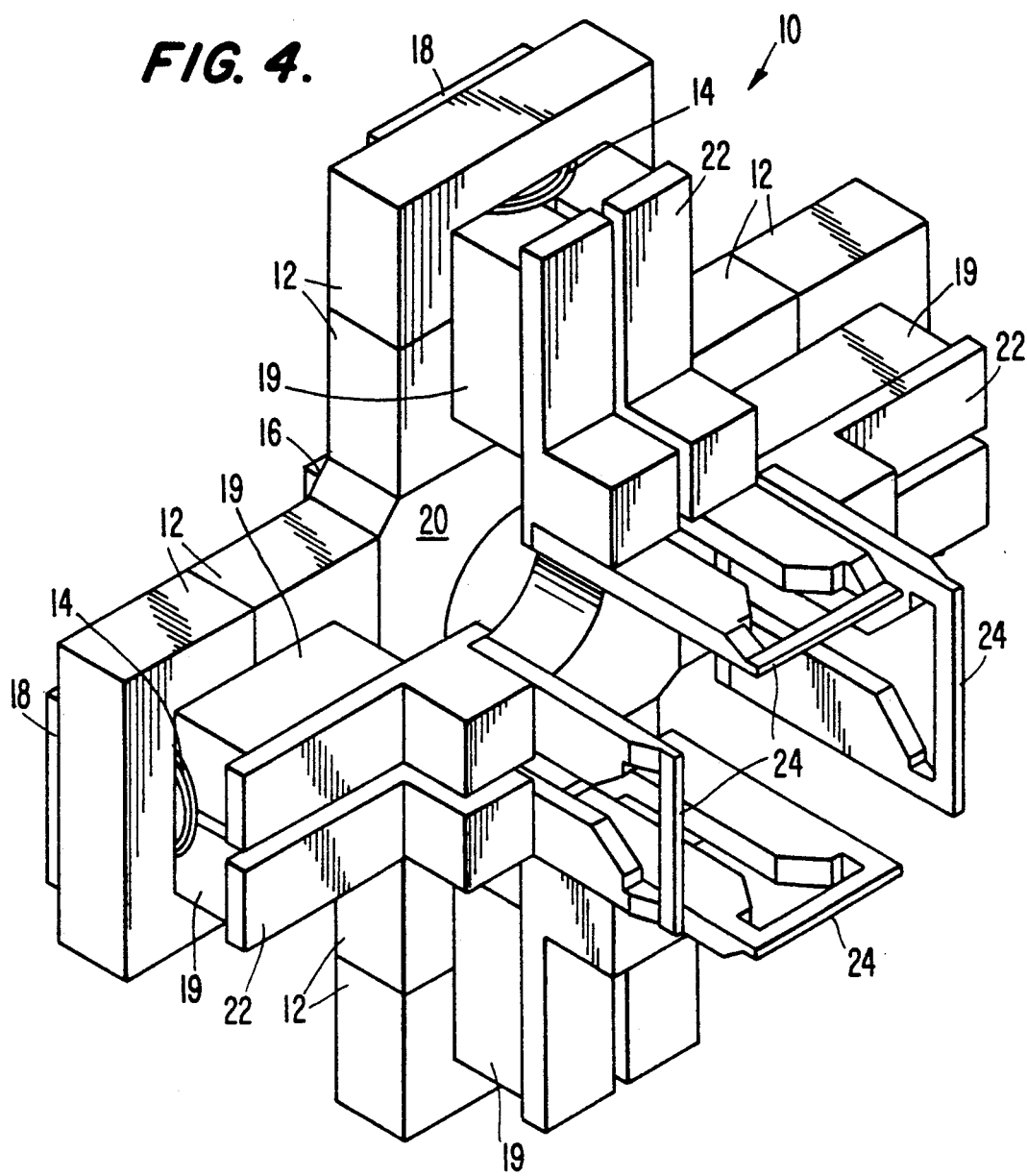

HIGH FREQUENCY THERMODE DRIVEN DEVICE EMPLOYING ONE-TURN-SECONDARY TRANSFORMERS

FIELD OF THE INVENTION

The present invention is directed to a high frequency thermode driven device for use in hotbar soldering of high lead-count integrated circuits onto circuit boards, or the like, and more particularly, to a compact high frequency thermode driven device including a plurality of one-turn-secondary transformers.

BACKGROUND OF THE INVENTION

Conventional thermodes are heated with power-line frequency power coupled to the thermodes by means of high current capacity power cables from large power transformers located remote from the thermodes. These power transformers are typically controlled by line voltage triacs. This conventional apparatus and method for powering thermodes, using long, heavy cables and large power transformers, is unsatisfactory for use in many automatic assembly machines where the parts placement heads must be capable of multiple functions and high speed movement.

SUMMARY OF THE INVENTION

The present invention overcomes the above disadvantages by providing a hotbar drive configuration having a high frequency source and miniature transformers mounted as close to the thermode as possible. The high frequency thermode-driven device in accordance with the present invention includes a support frame having a plurality, preferably four, projections extending radially outwardly therefrom to form a cross-shaped frame. Each outwardly extending projection is associated with a transformer core having at least one aperture with a primary winding inserted therein. Each outwardly extending support frame projection includes a pair of downwardly (when in their operable position) extending "ears" that are inserted into the aperture of the corresponding transformer core so as to surround the primary winding. The device further includes a plurality of thermodes, each of which is electrically connected to a corresponding pair of ears. In this way, the support frame not only acts as a structural support, but also as a one-turn-secondary winding for each of the transformers.

BRIEF DESCRIPTION OF THE DRAWINGS

FIG. 4 is a perspective view, as in FIG. 1, showing all four thermodes.

DETAILED DESCRIPTION OF THE PREFERRED EMBODIMENTS

Figure 1:
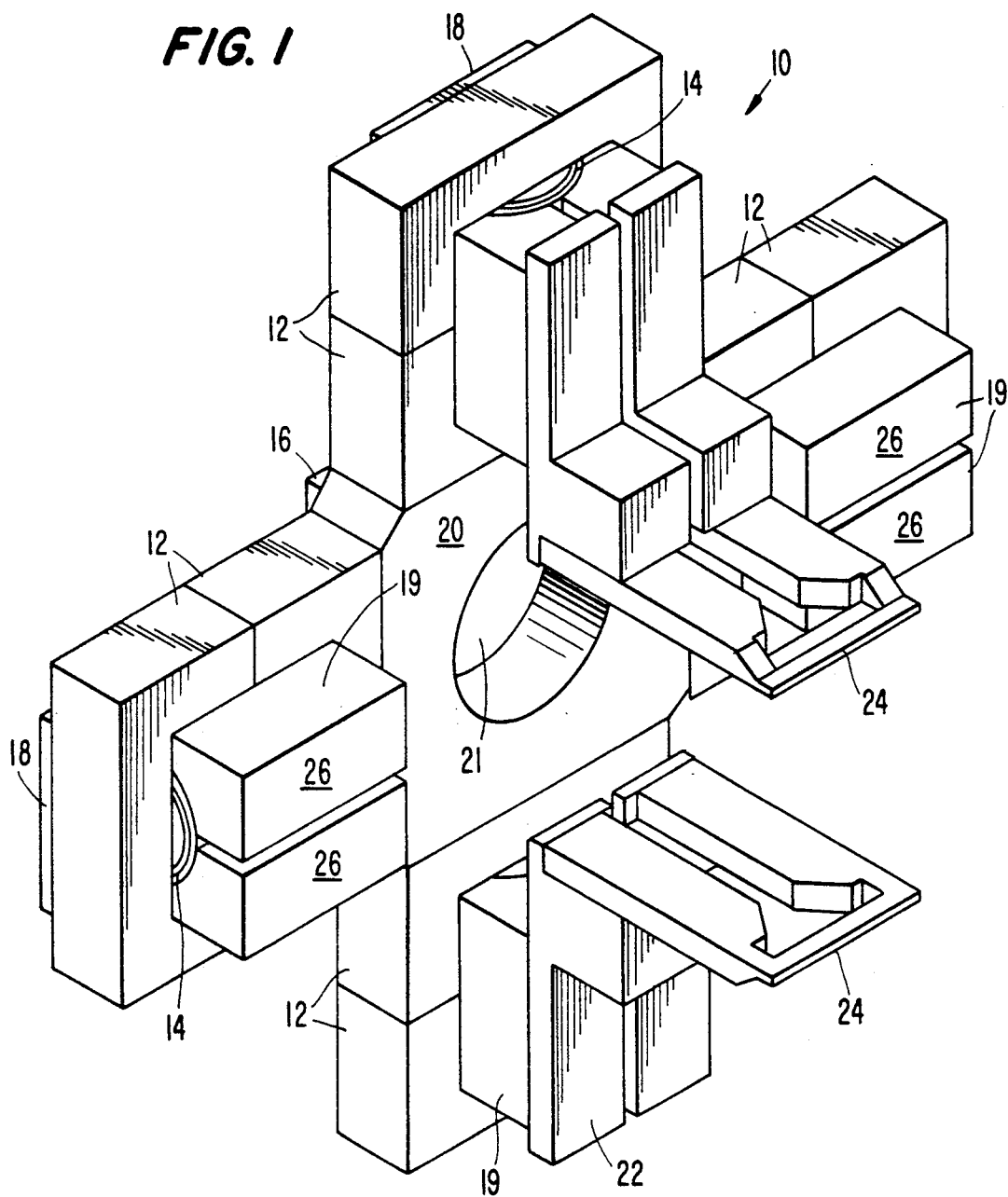
FIG. 1 a perspective view illustrating a preferred embodiment of high-frequency thermode driver employing one-turn-secondary transformers in accordance with the present invention, with only two thermodes shown for the sake of simplicity.

The thermode driver device in accordance with a preferred embodiment of the present invention is illustrated in FIGS. 1 and 4 and generally designated 10.

Thermode driver device 10 preferably includes four transformer core 12 mounted radially outward on a transformer core support frame 16, 18 and 19. Transformer cores 12 are preferably conventional double aperture transformer cores, i.e., two, opposing E-shaped magnet cores, as illustrated in FIGS. 1 and 4, although it is envisioned that other transformer core arrangements can be used, as will be discussed in more detail below.

Figure 2:
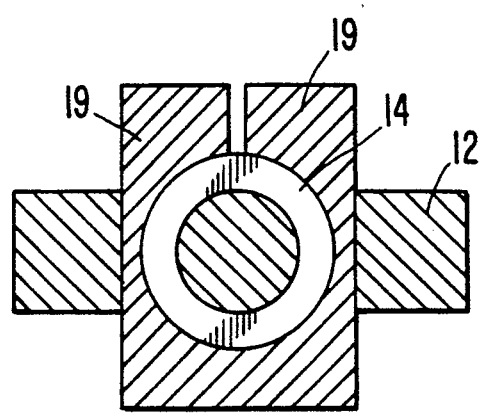
FIG. 2 is a sectional view of one of the one-turn-secondaries and it associated primary winding shown in FIG. 1.
Figure 3:
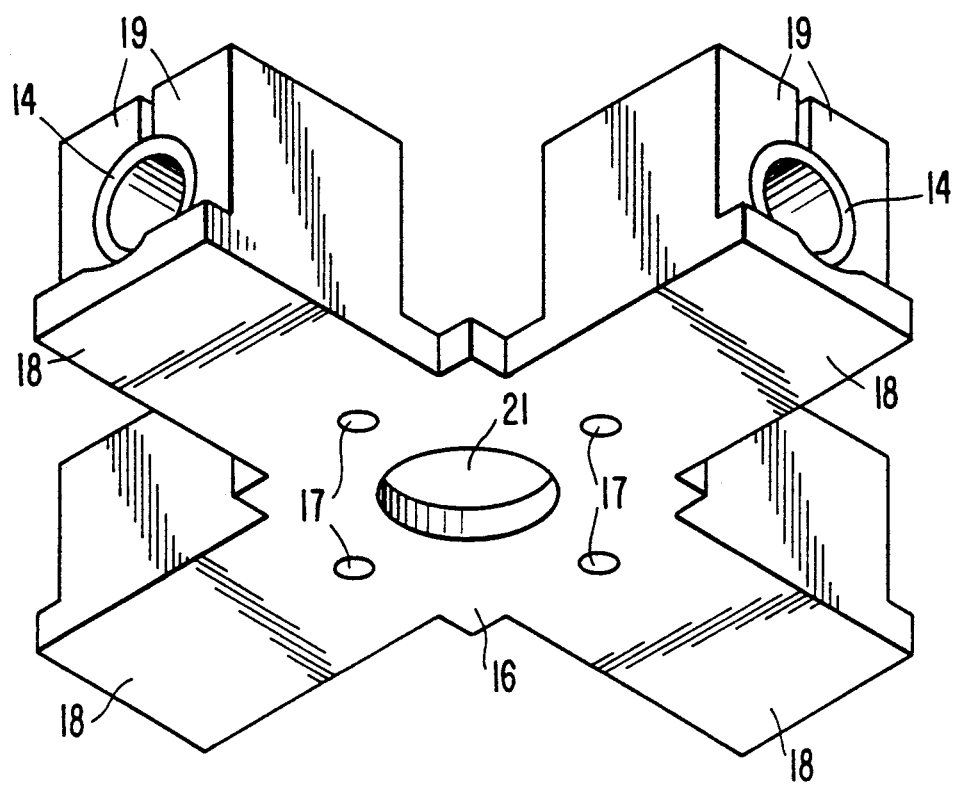
FIG. 3 is a perspective view of the support frame and one-turn-secondaries shown in FIG. 1.

Transformer core support frame 16 is mounted on a support 20 and is preferably formed of copper, aluminum, magnesium, or the like, via suitable fasteners (not shown) which extend through holes 17 formed in the support. Support frame 16, as most clearly shown in FIG. 3, has a plurality of projections 18 extending radially outwardly therefrom. In a preferred embodiment, four such projections are employed, so that the support frame and projections form a cross-shape. Each projection 18 has a pair of downwardly extending opposing "ears" 19, which surround a primary winding 14 and projects through transformer core 12, as shown in FIG. 2. The support frame 16, projections 18 and ears 19 are preferably formed as an intricately machined unitary piece.

Each pair of ears 19 protrudes through the apertures of the corresponding transformer core 12 outside of primary winding segments 14. The ears preferably fill the aperture. The transverse opening separating the individual ears in each pair permits the primary winding segments 14, preferably in the form of wound coils, to be inserted therein, so that the ears surround their corresponding primary winding.

The front face of each of the ears 19 forms terminals 26. Thus, each of the transformer cores with its corresponding ears and primary winding is an independent miniature transformer with the ears 19 acting as a one-turn-secondary winding when connected to a load impedance, such as a thermode (although all four of the one-turn-secondaries are of a single piece of metal). A thermode holder 22, having a very low resistance thermode 24 disposed thereon, is mounted to a corresponding pair of said terminals 26 to electrically connect terminals 26 with the corresponding thermodes, thus completing the secondary circuit of the transformers.

The transformers are preferably independently driven at 10 to 20 kHz by four amplifiers which may be pulse-width-controlled switching amplifiers (not shown) connected to the primary windings. Each amplifier operates independently, but preferably under the control of a common microprocessor, personal computer, or the like, which commands the desired temperature profile for the thermodes. Each thermode preferably includes a thermocouple or other temperature sensor (not shown) which feeds the actual thermode heater bar temperature back to the control amplifier. The control circuit in the amplifier then modulates the power fed to the individual transformers to achieve the desired temperature time profile at the thermode. The transformer itself steps down the voltage and provides the high current required by the very low resistance thermode.

Support 20 and support frame 16 are designed to be mounted via central aperture 21 on a floating mount (not shown) of the automatic assembly machine for positioning over the circuit board, such as the type of mount disclosed in U.S. Pat. No. 4,768,702, particularly in FIGS. 14–18, which is incorporated herein by reference. Thus, in use, the thermodes 24 extend downwardly from the mount for soldering of the integrated circuits to the circuit board located therebelow.

Through the arrangement of the present invention, a thermode driver device can be obtained in which: 1) the power components are much smaller; 2) the power loss, and hence power consumption, are greatly reduced; 3) the power cabling to the hotbar head assembly is much lighter; and 4) the power control system is much smaller and lighter. Thus, the invention permits hotbar soldering to be easily, effectively and efficiently used in the surface mount component assembly industry.

The foregoing description is for illustrative purposes only. Modifications can be made, particularly with regard to size, shape and arrangement of parts, within the scope of the invention as defined by the appended claims.

For example, instead of the ears 19 as illustrated in the Figure, the secondary winding can be formed as one or more pairs of "fingers" which fill the full radial opening of the transformer aperture. The primary winding is then formed of a series connection of short coils fitted into the spaces between the fingers to optimize the intimacy between the primary and secondary, thus reducing the leakage inductance. The secondary fingers one each side are then connected together to form the two terminals.

For another example, toroidal or single aperture transformer cores can be used instead of the double aperture transformer cores illustrated in the Figures. In this case, the primary winding is wound directly on the core and the one-turn-secondary completely envelopes the core such that the portion protruding through the aperture forms one terminal and the material outside the core forms the other terminal.

This example has the additional advantage that the manufacturing costs can be reduced, since there is no complex support frame with projections to machine. Instead, in this example, the primary is wound directly on the core, and the assembly is then encapsulated with an insulating coating, set on an insulating hollow cylinder or ring approximately the diameter of the toroid and cast in a final configuration using aluminum or magnesium.

We claim:

1. A high-frequency device having a plurality of transformers, each transformer having a primary winding driven by a high-voltage source, said device comprising:
   a support member, said support member having a plurality of projections extending radially outwardly from a central portion, each of said projections having at least one pair of ears extending therefrom;
   a plurality of transformer cores corresponding in number to the number of said projections, each of said ears protruding through an aperture of said corresponding transformer core outside of the primary winding; and
   a plurality of thermodes corresponding in number to the number of said projections, each of said thermodes being electrically coupled to said corresponding projection;
   wherein each of said projections acts as a one-turn-secondary winding for a corresponding primary winding.

2. A device as in claim 1, wherein said transformer core portions are of the double aperture type.

3. A device as in claim 1, wherein there are four said projections.

4. A device as in claim 1, wherein said support frame with said projections is substantially cross-shaped.

5. A device as in claim 1, wherein said primary windings are in the form of wound coils or cylinders.

6. A hotbar drive device having a high-frequency source and a plurality of transformers, said device comprising:
   a support frame, said support frame having a plurality of projections extending radially outwardly therefrom;
   a pair of ears extending from each one of said projections;
   a transformer core disposed on each of said projections, each transformer core having an aperture formed therein;
   a primary winding inserted in each of the apertures in said transformer cores and coupled to said high-frequency source; and
   a thermode holder having a thermode mounted thereon electrically connected to each of said pairs of ears;
   wherein each said pair of ears protrudes through the aperture of the corresponding transformer core, surrounding the corresponding primary winding, to form a one-turn secondary winding.

* * * * *